July 17, 1951     B. B. WHITTAM     2,560,620
ROLL-SHEAR VIBRATION ISOLATION MOUNTING
Filed Nov. 1, 1945     4 Sheets-Sheet 1
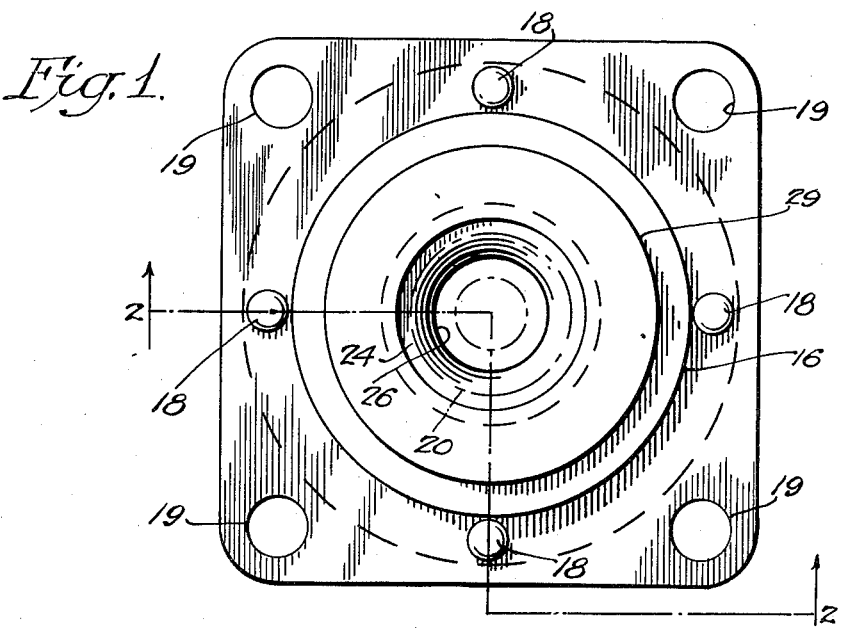
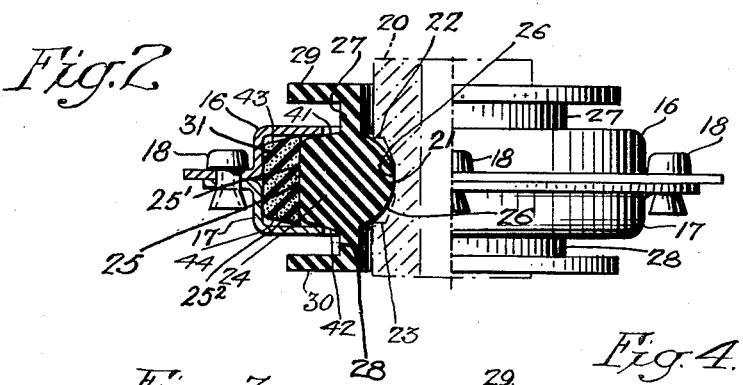
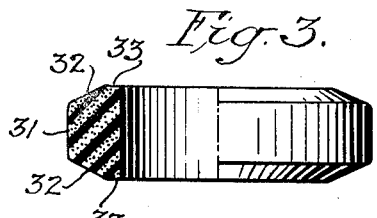
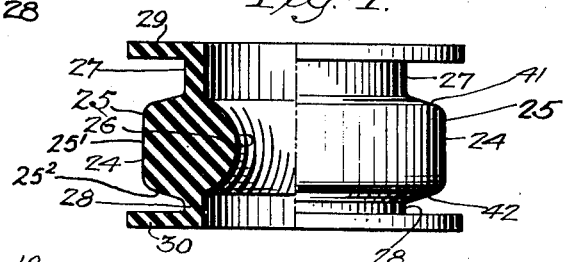
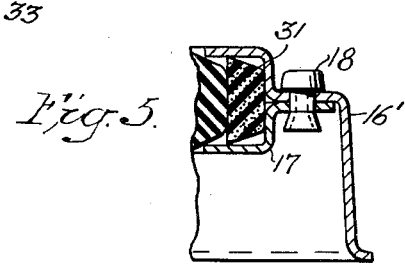
Inventor:
Benjamin B. Whittam
Attorneys.

July 17, 1951  B. B. WHITTAM  2,560,620
ROLL-SHEAR VIBRATION ISOLATION MOUNTING
Filed Nov. 1, 1945  4 Sheets-Sheet 2
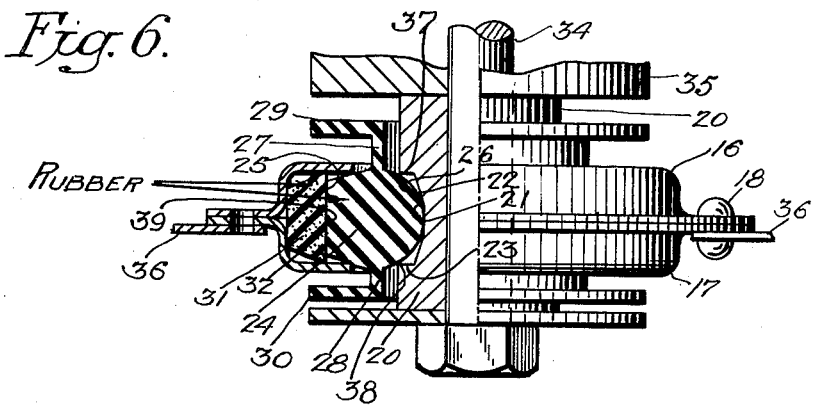
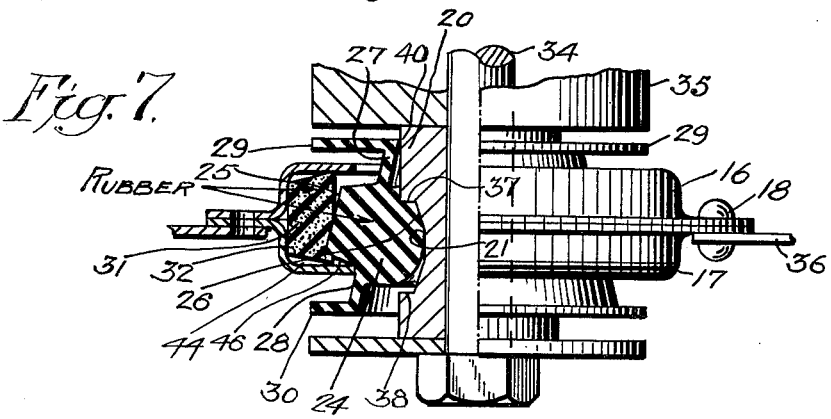
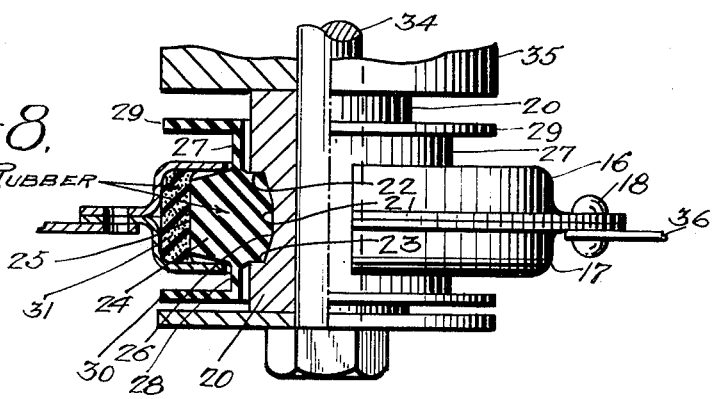

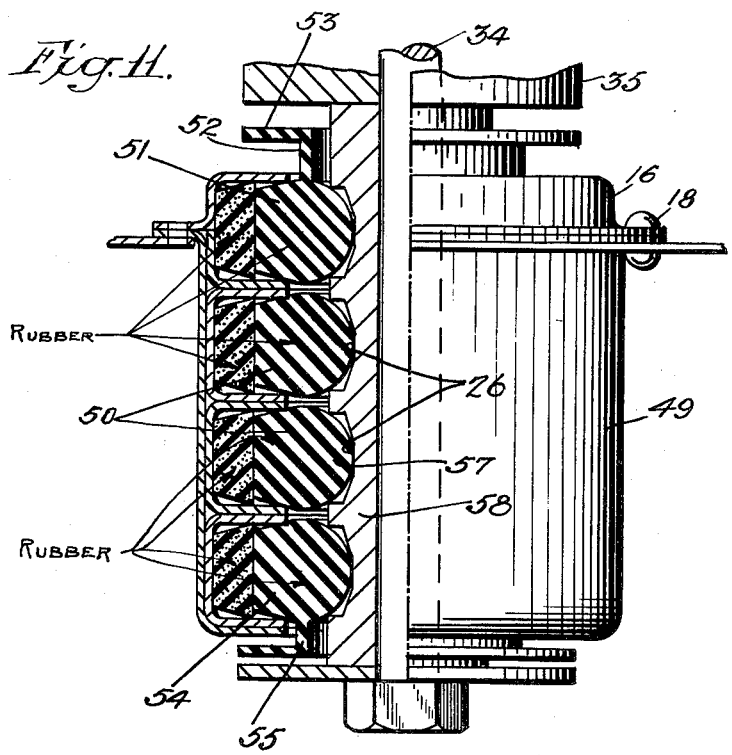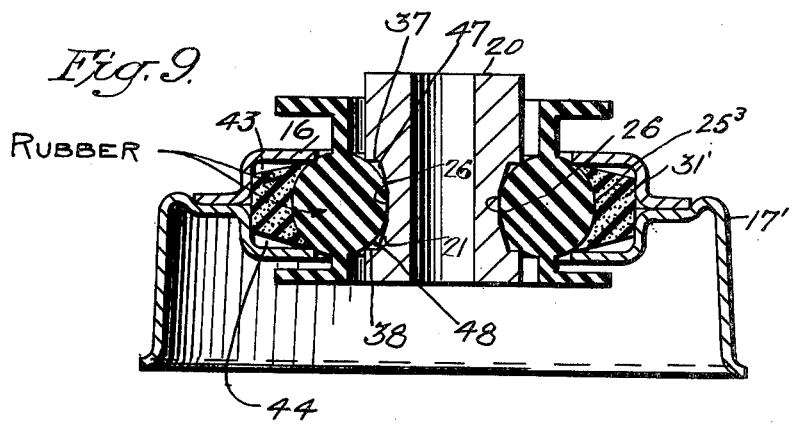

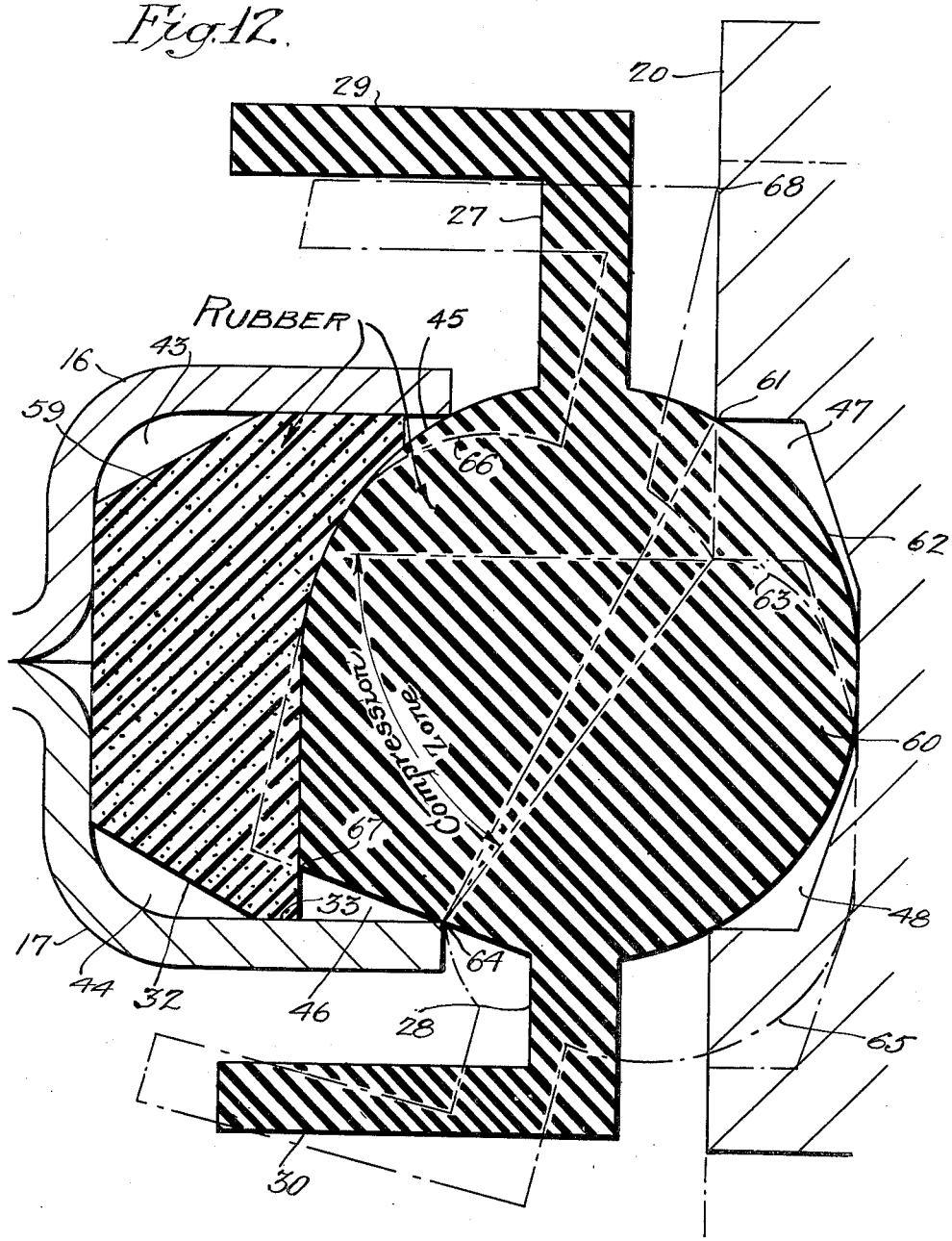

UNITED STATES PATENT OFFICE 2,560,620

ROLL-SHEAR VIBRATION ISOLATION MOUNTING

Benjamin B. Whittam, Doylestown, Pa.

Application November 1, 1945, Serial No. 626,005

16 Claims. (Cl. 248—358)

My invention relates to resilient mountings and particularly mountings intended to prevent the transmission of vibration.

Forced vibrations are set up in airplanes by the gas explosions in the engine cylinders, by propeller blades and other moving engine parts. Due to the fact that a percentage of this forced vibration passes on to the airplane structure through the engine vibration isolation mounts it becomes necessary to protect all other operating and recording equipment from the serious effect of this forced vibration. Vibration isolation mountings are therefore required to protect these parts from damage.

Inasmuch as forced vibrations or oscillations occur in many planes—vertical, horizontal and intermediate, vibration isolating mountings must have elastic freedom to vibrate in these planes. While the magnitude of these forced vibratings or frequencies may vary in the different planes, it is highly desirable, in fact ideal if the natural frequencies of the elastic mountings are the same, or very nearly the same in all planes.

Every suspended body, having weight and elasticity, exhibits a tendency to vibrate freely when deflected from its position at rest. When a body is released from its deflected position there is a tendency to balance the kinetic energy of the mass and the potential energy of the elastic part of the body, tending to bring the body to rest. The number of such vibrations, per unit of time represents the natural frequency of the body or system. The natural frequency depends upon the mass and elasticity of a body or system and is in no way related to external exciting forces or impulses. However, when the frequency of external forced impulses approaches the natural frequency of the elastic body, the amplitude of the vibrating motion of the elastic body may become very large. When the rate of vibration of the forced impulses equals the natural frequency of the elastic body, resonance is attained and practically all of the motion or vibration is transmitted to the structure which the elastic body is supposed to protect.

Natural rubber or synthetic derivatives have proved by far the most satisfactory material for mounts. Due to the difficulty of obtaining natural rubber and its consequent scarcity, synthetic derivatives are being substituted, not only for vibration mountings, but also for many other applications, where natural rubber was formerly used.

Synthetic derivatives have been so perfected, that they now actually give better all around performance characteristics than natural rubber, particularly for use in airplanes, and the like, where the temperatures vary from extreme heat to extreme cold—(from 150° above to 65° below zero Fahrenheit)—however, synthetics are most difficult to vulcanize to metal bases. For my roll-shear mountings this is no problem, as there are no vulcanized attachments.

Originally, it was sufficient to provide the required flexibility in but one plane, i. e., axially, and the fact that in other planes it was much less flexible and in the horizontal plane (sideways) the least flexible, was not of major importance. Now, however, due to radical changes in design, performance and speeds and the development of many new and delicate instruments and other sensitive apparatus, the art has developed to a point where axial resilience is no longer the criterion of an efficient mounting. This is especially true where delicate instruments and other sensitive apparatus must be protected against lateral vibrations, when, for example, a plane banks at 90° or less from normal or axial. This requires that vibration isolating mountings must respond to approximately the same frequency and have substantially the same resilience, axially, laterally and in intermediate directions.

Installation and mounting of delicate instruments in vehicles and aircraft, particularly of the military type, have presented serious problems, difficult of solution heretofore. Not only must modern precision instruments be protected from vibration and shock imparted to the vehicle or plane from external sources such as shell fire and collision with physical obstacles, but also the instruments must be protected from the vibration of the vehicle's own power plant and armament.

My invention is in no way limited to use in airplanes or other vehicles but the airplane use so far is the most difficult field of application that I have used it for my illustration, considering that structure which will satisfy its requirements will serve any other field.

A vibration isolating mounting may be employed at the source to dampen or completely absorb vibrations, thus preventing their transmission to the supporting structure; or conversely, delicate instruments such as radio, radar, bomb sights, compasses, etc., may be insulated to prevent their being damaged by receiving harmful vibrations or shocks from these supporting structures.

The main support is vertical and of course with dipping or tilting of the plane, what is vertical with differ a great deal with respect to the mount. For this reason, a support is tested in three planes, the first vertical and the second and third horizontal in different planes. The support is tested also at 45° angles which will be diagonal between the vertical and one of the horizontals and the support must test approximately equal in any of these positions.

I have designed a roll-shear vibration isolating mount well suited for use with natural rubber where the temperature to which it will be subjected will not be prohibitive, and also particularly adapted to use with synthetic rubber derivatives. Synthetic rubber is highly advantageous in aircraft work where extreme temperature variations are encountered.

Although natural rubber loses much of its elasticity and resilience at low temperatures, there are a number of artificial rubbers which maintain nearly uniform action throughout the entire temperature range. For aircraft this range varies from 150° above zero to 65° below zero, Fahrenheit.

The synthetic product Buna S, for example, is entirely suitable and really excellent for the present purpose; at 65° below zero there is approximately only a 35% impairment of its physical properties. It is also moisture proof. It is the product which I prefer for my mount for the primary ring. It is suitable also for the secondary ring. The latter is preferably fabricated of soft rubber. "Sponge" rubber is the best. It is desirably made from a Buna N product which stands the cold and is oil resistant. It will be understood, however, that other artificial or synthetic materials are suitable, such as neoprene which will do for both rings. Also, natural rubber can be used within its temperature range.

A very great advantage of my construction resides in the fact that no bonding of the rubber, natural or synthetic, to metal is required and hence synthetic products may be used freely in place of the natural rubber, with consequent improved low temperature characteristics. With other types of mountings, failure generally occurs because of the difficulty of vulcanizing or bonding synthetic rubber to metal.

A primary purpose of my invention is to provide a highly sensitive vibration isolating and shock absorbing mounting for delicate instruments and the like.

Another purpose is to provide a highly sensitive vibration absorbing mount having variable vibration absorbing properties over a wide range of frequencies.

A further purpose is to provide a vibration isolation mount which gives satisfactory performance over a wide temperature range without the necessity of bonding, or of using crude rubber.

A further purpose is to provide a vibration isolation mount which gives satisfactory performance over a wide range of loadings.

A further purpose is to provide a vibration mount which gives satisfactory performance at low temperatures.

A further purpose is to use the same housing and hub with inner and outer rings of differing resistance to compression to accommodate different loads and different needs in their support.

A further purpose is to accommodate my supports to substitution in the place of prior, inefficient supports as well as to permit change of the characteristics of a support by replacing one or both of the rubber reaction rings by rings having different characteristics.

A further purpose is relatively to adjust the resistance due to vertical and horizontal movements with respect to the support so that the various reactions may be approximately balanced.

A further purpose is to use sponge rubber or its equivalent to resist the distortion caused by compression and rolling of the primary ring and to reduce lateral distortion of the altered primary ring body due to banking or other operating characteristics in the plane or other holder of the support.

Another purpose is to provide a vibration isolator or mount having one or more rotational or supporting points.

A still further purpose in a vibration isolator or mount is to use a plurality of individual resilient elements, all of which are freely supported, so that each element can function independently.

A still further purpose in a vibration isolator or mount, is to use a plurality of synthetic rubber motion resisting elements having different dampening characteristics.

Further purposes will be apparent from the specification and drawings, in which:

Figure 1 is a plan view of a preferred form of my vibration isolation mount.

Figure 2 is an elevation of the structure of Figure 1 partially sectioned along lines 2—2.

Figure 3 is a partially sectional detail of the secondary vibration absorbing element.

Figure 4 is a partial sectional view of the primary vibration absorbing element.

Figure 5 is a detailed sectional view of a modified form of vibration absorbing mount.

Figures 6, 7 and 8 illustrate the structure of Figure 2 in the normal, axially displaced, and horizontally displaced positions respectively.

Figure 9 is a sectional view of a modified form of vibration mount in which the flat edge of the primary dampening element is rounded.

Figure 10 is a partly sectional view of the secondary vibration absorbing element used in the modified form of Figure 9.

Figure 11 is a shock absorbing mounting having a series of independent and separately actuated vibration absorbing elements.

Figure 12 is a detailed view of the relative displacement of the primary and secondary vibration dampening elements.

While certain novel features of the invention are disclosed herein with considerable detail with respect to certain particular forms of the invention, I do not desire to be limited to such details, since many changes and modifications may well be made without departure from the spirit of the invention in its broadest aspect.

Like reference numerals denote like characters in the several figures of the drawings.

Referring now more particularly to the drawings, the preferred mounting assembly is comprised of a pair of hollow open ended housings which may be called the upper housing 16 and the lower housing 17. After assembly of the component parts, the housings are riveted together by rivets 18 or may be joined by metal screws not shown and may be mounted in a convenient manner at holes 19. Housings 16 and 17 enclose, and by their vibration-dampening construction support, spindle or hub 20 having a circumferential groove 21 with walls 22, 23 at the edges, in vertical cross section of rather abrupt or sharply angular cross section.

Positioned intermediately between the housings 16 and 17 and hub 20 is a primary vibration absorbing element which is shown as ring 24. The ring comprises a body portion of resilient material such as natural rubber where the temperature to be met is not prohibitive or synthetic rubber where either extreme of temperature is destructive of natural rubber. The ring is solid and in thickness extends from an outer surface 25 to an inner surface 26.

The outer surface may vary greatly in axial sections. It is shown as having a cylindrical outer surface 25' (of straight axial section) and conical ends $25^2$ in the earlier figures but as of circular upper axial section as at $25^3$ in Figure 9. In Figure 12 the upper outer portion is circular in axial section while the lower outer section is as in the earlier figures.

From the middle portions of the body, skirts 27 and 28 extend oppositely in generally cylindrical form, the cylinders surrounding the axis of the ring and terminating in flared annular snubbing washers 29 and 30 (Figure 4). The main functions of the skirts are to support upper and lower snubbing flanges so that these flanges will overlap the housing and will prevent engagement of the outer housing walls with adjacent structure; and particularly to prevent striking of the instrument supported or the shelf upon which it is held against the upper housing walls. The snubbing flanges overlap and underlap the housing.

The secondary dampening element comprises an annular ring cushion 31 made from a softer, more resilient material than that of the primary ring 24. Such a material may be soft or "sponge" rubber. The ring cushion 31 is desirably bevelled at 32 on its outer (end) edges, the bevels extending completely to the inner diameter as shown in the cross sections of Figures 2 and 5, or a slighter bevel may be employed leaving a small flat area 33 as shown in Figure 3. The purpose of this construction will also more fully be explained hereinafter. In the preferred assembled mounting, hub 20 is supported axially upon the curved inner body portion 26 of primary ring 24, which is in turn axially supported directly by housings 16 and 17. It is positioned radially or laterally by ring cushion 31, which encloses the outer circumference 25 of the body portion 24.

Referring now to Figure 6, hub 20 is shown as fastened by bolt 34 to instrument 35 and housing 16 is riveted to a main support 36 between which instrument and support it is desired to isolate vibration. The weight of instrument 35 is carried by hub 20 and in turn is transmitted to primary ring 24 at edge 37. As the upward or downward vertical force on hub 20 increases, there occurs a corresponding increase in bearing surface between edge 37 and the ring 24. This is clearly illustrated in Figure 7 which shows hub 20 displaced downwardly from its position in Figure 6. It will be apparent that the same action will take place upon displacement of hub 20 in either direction, since edge or shoulder 38 is identical with edge or shoulder 37.

In addition to initial bearing or engaging compressing surfaces at edges 37 and 38, gradually increasing bearing surfaces 39 are developed along the inner periphery of the ring cushion. When the ring 24 tends to rotate, as shown in Figure 7, the edge 37 tends increasingly to compress the ring cushion. In addition, compression and distortion of the ring will cause inner edge 40 of skirt 27 to engage hub 20 over an increasing pressure area, thereby providing an increasing resistance to further displacement of the hub with respect to the housing. In the event that maximum displacement is attained, my construction provides additional resilience by means of washers or flanges 29 and 30, which will act as axially compressible bumpers or snubbers at the limit of displacement and prevent metal-to-metal contact between the parts.

It has been found desirable to provide a longer skirt 27 on top of the mount than is necessary in the corresponding skirt 28 (Figure 4) on the bottom, in order to secure greater clearance before flange 29 is compressed between housing 16 and the instrument or other adjacent parts.

The downward displacement of the hub 20 will vary, depending upon the static load imposed. Figure 6, therefore illustrates a condition of no load as distinguished from a condition of static load such as would be caused by the mere weight of the instrument which is to be isolated. There would normally be a displacement of less than as shown in Figure 7 but more than is shown in Figure 6.

The tapered construction of the ring cushion 31 additionally provides slight initial bearing surface with gradual increasing resistance to lateral displacement. This feature is illustrated by comparing Figures 7 and 8, the latter of which shows a purely lateral displacement with consequent compression of the ring cushion 31 to fill up the initially empty space in housings 16 and 17 and also the compression of ring 24 to fill up the initially empty parts of the angular groove in hub 20. The several spaces indicated permit the rings to be distorted as well as compressed, dividing the resistance to movement among these two types of reaction of the rubber.

The outer circumference of the ring 24 in the form of Figures 2 and 4-8 has been made flat at 41 with tapered sides 42 to engage the inner edges of housings 16 and 17, in order to reduce or eliminate drift and slip when extremely low temperatures are encountered. This has proved to be important for low temperature design, but for installations not requiring this characteristic, cost of manufacture may be reduced by employing a head or body member 41 of generally circular cross section as shown in Figure 9. In this event, secondary ring 31 will be correspondingly constructed with a concave inner surface as shown on ring cushion $31^1$ (Figure 10).

Another important feature is the peculiar shape of the circular groove in hub 20. As above noted, square shoulders 37 and 38 are provided for initial small area support in addition to giving a positive non-slip rolling movement when axial displacement occurs and to provide spaces to be filled by the material of the ring.

It will be noted that my construction contemplates recesses 43 and 44 between secondary ring cushion 31 and housings 16 and 17 as well as areas 45, 46, 47 and 48 around primary ring 24. Not only do these areas provide additional resilience and permit gradual distortion of both rings but they act as air cushions to increase the resilient action of the whole mount.

Upper housing 16 is removable to permit assembly or replacement of the parts in the forms shown in Figures 1 and 2. The relative positions of the housing, however, may be reversed as shown in Figures 6-8 to make the lower housing 17 removable if desired. Figures 5 and 9 show a modified lower housing having a conical base support. This particular design provides interchangeability with other mountings now in use.

Figure 11 illustrates a multiple type mounting for use when heavier loads must be supported. This construction is generally similar to that of Figures 6-8 except that housing 49 is much deeper than housing 17. This is for the purpose of accommodating a plurality of ring units, each of which has inner and outer rings which performs functions identical with those performed by the ring portions in Figures 6-8, but skirts and flanges are located at the ends only. Thus the primary rings have been modified so that the uppermost ring 51 has an upper skirt 52 and flange 53 only and not a lower skirt nor lower flange; and lower ring 54 has lower skirt 55 and flange only, not an upper skirt nor upper flange. Intermediate rings are identical with the body portions of rings 24. Likewise it will be apparent that hub 58 carries a plurality of grooves corresponding in number with the number of body portions 26, some of which body portions, as noted, are provided with one skirt and one flange or snubber only and others of which have neither skirts nor snubbers. In this particular, Figure 11 is to be contrasted with other figures in which there is a single groove only corresponding with a single body portion 26 only, of which an example is seen in Figure 2.

Figure 12 is an enlarged detail illustrating the compressive roll-shear action of my mount. Soft rubber ring 59 is a composite of ring cushions 31 and 31¹ in that it is partially flat and partially concave inwardly. Likewise, ring 60 is a composite of rings having surfaces 25 and 25³ in that the bead or body portion is partially flat and partially convex outwardly. When hub 20 is displaced downwardly from its full line position to the broken line position, edge 61 displaces and compresses the ring 62 to the position shown at 63. This in turn causes the resilient ring to be compressed between edge 61 and edge 64 with the consequent bulging at areas 65 and 66. Likewise, compression of ring 59 takes place at 67 and the upper skirt 27 bears against hub 20 at 68. As further displacement occurs, the bearing surfaces between the various parts and the compression of the resilient members progressively but gradually increases to a point where snubbing occurs, as described before. This provides an extremely resilient mount capable of absorbing a very high percentage of vibration over a wide frequency range.

It will be evident that the downward deflection or movement of the instruments or equipment supported will be greatest in normal operation of the plane, i. e., axially, downward. To provide for this, the skirt above the solid inner, or primary ring, has been made longer than is the corresponding skirt extending below the solid inner ring.

The durometer range of the material for the solid rubber (natural or synthetic) inner rings is from about 20 points to about 75 points. The outer rings, preferably of sponge rubber, range in durometer test from about 10 points to about 50 points. It is quite desirable that the inner rubber rings have a higher durometer test than the durometer test of the outer rubber rings in any given assemblage. With sponge rubber the durometer test is higher for a rubber having fine or small air spaces than for one having large air spaces; and this is true whether the "rubber" be natural or synthetic.

The prior art cushion devices in large measure have been characterized by bonding between the rubber used and the metal parts which are associated with the rubber.

Though natural rubber can be bonded to metal to advantage, successful bonding of synthetic rubber to metal is more difficult, placing a premium upon constructions which do not require bonding if the temperature changes or the freedom from injury by oil be considered critical. It will be noted that the structure described does not require bonding and for this reason can take full advantage of the special characteristics of synthetic rubber.

Because each of the different rubbers, natural and the several types named of synthetic rubbers, finds a special purpose in which it is excellent and for which it is perhaps better suited than is any other, and all of the different rubbers, therefore, have unique utilities, I have used the term "rubber" generally to cover natural rubber and any type of synthetic rubber, unless the term be explained where used by the word "natural" or "synthetic" rubber.

Though it is preferred to use Buna N rubber, which is oil resistant, for the sponge rubber or its equivalent "soft" rubber, Buna S rubber is operative for both. Where the danger from oil is excessive, neoprene G. N. is used. Any synthetic rubber which will retain its characteristics within even 50% at a temperature as low as minus 50° F. would serve the general purpose.

In all of the synthetic rubbers, when used at very low temperatures, almost the entire characteristics of compressibility and expansion after compression are preserved, and the percentage of these capabilities retained for a range between 160° F. and —65° F. is approximately 65% for the best of the synctthetic rubbers, whereas the natural rubber shows up very poorly in comparison.

It will be evident that the same shaft with its annular angular groove and housing and with its inner groove edges axially spanning the inner (primary) rubber ring may be used with greatly different hardness or durometer of inner and outer rubber rings, natural or synthetic, to secure widely variant cushioning characteristics, giving a flexibility in service which is as valuable as it is unusual. It makes it possible to match the needs of heavier or lighter apparatus and to rougher or more delicate instruments as the case may be by merely changing the rings.

It will be evident that the use of a square-bottomed groove in the hub permits the primary ring to be crowded into the corners provided by the square groove, supplying spaces to which the rubber may be guided during the distortion of the ring.

Buna S rubber retains approximately 65% of its operating characteristics when the temperature is 65° F. below zero and is the preferred material for the primary (inner) rubber ring, which is intended to take almost the entire vertical component of the pressure. For the soft rubber, it is desirable to use Buna N. Instead of the sponge rubber, a rubber can be used which is not sponge but which has the characteristics of sponge rubber here sought and particularly that the extent of compression for a given impulse corresponds generally with that of sponge rubber.

It will be evident that the sponge rubber or its equivalent does not directly modify the reaction of the primary ring to compression and rolling movement between the shoulders which are out of line, the secondary ring tending, however, to reduce the effect, i. e., the amount of distortion which is caused in the primary ring.

It will be evident that the question of selection of the particular rubber for use will depend upon the intended conditions of service. All of the rubbers are fully operative in the construction shown, but some of them have special advantages in locations where they are subjected to low temperatures or to attack by oil or to oil at low temperatures.

It will be evident that the use of (a) a square bottom groove in the housing (b) embracing a sponge rubber ring of special shape (compressible within itself by reason, in part, of its porosity), (c) an angular groove in the hub supporting the primary ring, together with (d) the air cushions formed in these grooves, collectively absorb the imposed reactions from the primary ring when it is distorted by axial or angular movement or directly compressed by lateral displacement. The result, as herein described is a mount having resilient and vibration-absorbing characteristics approximately the same in all planes.

It will be evident that the thrust delivered is the push given or the force applied to produce displacement or deflection, that is, movement away from a point. Likewise resilience has been taken as the equivalent of elasticity, i. e., the property possessed by substances which is effective to bring them back to their former shapes or positions when released from deflected positions.

It will be evident that the engaging edges referred to are intended to be abrupt edges but without being cutting edges. They may, therefore, be considered as dulled or slightly rounded.

In view of my invention and disclosure variations and modifications to meet individual whim or particular need will doubtless become evident to others skilled in the art, to obtain all or part of the benefits of my invention without copying the structure shown, and I therefore, claim all such in so far as they fall within the reasonable spirit and scope of my claims.

Having thus described my invention what I claim as new and desire to secure by Letters Patent is:

1. A ring compression and snubbing unit for use in a roll-shear vibration absorbing mount, of material having the general characteristics of rubber and comprising an annular body having a curved axial cross section on the innermost portion, having axially extending cylindrical skirts on opposite side of the body and snubber flanges extending radially outwardly away from the axis and attached at the edges of the skirts.

2. A ring compression and snubbing unit for use in a vibration absorbing mount of material having the general characteristics of rubber and comprising a annnular body having axially extending skirts on opposite sides of the body and snubber flanges extending outwardly away from the axis and attached at the edges to the skirts, and an annular cushioning ring of more easily compressible material than the first ring, surrounding the first ring and adapted to take up compression from movement of the first ring in radial directions.

3. A vibration absorbing mount comprising a hollow housing having a central opening limited by abrupt edges, and a resilient ring body supported in said opening, a hub having a circular groove with abrupt edges, said groove engaging the inner part of the ring body, and a cushion of softer resilient material than the ring body between the resilient ring body and the housing, the ring body in unstressed position incompletely occupying the groove and the ring body and cushion in unstressed position incompletely occupying the space within the housing.

4. In a roll-shear vibration mounting, a ring gasket of solid rubber, a skirt thereon and a flange mounted at right angles to the skirt, a housing having an inwardly facing lateral recess and angular shoulders embracing the ring gasket, and a sponge rubber outer ring within the housing engaging the ring gasket laterally and radially.

5. In a vibration absorbing mount, an inner ring of solid rubber having a skirt generally parallel to the axis of the ring and an annular flange extending outwardly with respect to the axis, an outer ring of sponge rubber enclosing the inner ring and having the inner edges of the outer ring nearer the axis than the outer central part of the inner ring, a shaft within the inner ring grooved to provide edges which with axial movement of the shaft engage the inner part of the inner ring and a housing enclosing the outer ring and having inner edges which, with axial movement of the inner ring are engaged by the outer part of the inner ring, the inner ring in unstressed position incompletely occupying the groove within the shaft and the inner ring and outer ring in unstressed position incompletely occupying the interior of the housing.

6. In a roll shear vibration isolation mount, a hub adapted to support a load, and grooved annularly about the hub, a gasket within the hub groove having a generally cylindrical skirt annularly in line with the gasket and a flange at the end of the skirt, a sponge cushion ring about the gasket and a housing surrounding the sponge cushion ring having shoulders engaging the gasket to cause compression of the gasket with lateral movement of the gasket, and means for supporting the housing.

7. In a vibration-absorbing mount, concentric rings of material having the general characteristics of rubber and of different capacities to resist compression, a housing enclosing the outer of these rings and axially engaging the inner of these rings in both of the opposite axial directions of movement, a hub axially engaging the inner rings in opposite axial directions of movement, axially extending skirts on opposite sides of the inner ring, and outwardly extending snubbing flanges integral with the inner ring, one of the skirts being longer than the other skirt.

8. In a vibration absorbing mount, for supporting an instrument, an annular housing, a hub within the housing having an annular groove, a pair of concentric cushioning rings, one within the other and of different degrees of compressibility, the one which is less compressible being on the inside and extending within the groove so that axial movement of the hub is resisted by compression of this inner ring, a skirt on the inner ring extending axially beyond the housing and an annular snubbing flange upon the skirt extending radially beyond the inner edges of the housing and in position to underlap the instrument and adapted to lie axially between the housing and the overlapping portion of the supported instrument, the cushioning rings together incompletely filling the space within the housing and the hub groove.

9. A vibration absorbing mount, comprising a hollow housing having a radially inwardly facing central opening extending annularly about the housing and terminated by firm edges, a ring of rubber of the general compressibility of sponge rubber having approximately the durometer range of 10 to 50, extending annularly within the housing, and wholly outside of said edges, an annular body of cushion material whose outer part lies within the housing, firmer than the ring, of durometer range from 20 to 75, a hub within the latter body having an annular groove about the hub, within which hub part of the body lies so as to be compressed against the edges of the housing with axial movement of the hub, tubular skirts connected with the body and extending generally parallel with the hub, and snubbers connected with the skirts.

10. A vibration absorbing mount for aircraft equipment comprising a hollow housing having a radially inwardly facing central opening extending annularly about the housing and terminated by firm inner edges, a ring of soft rubber cushion material approximately agreeing with sponge rubber in compressibility, extending annularly within the housing, and wholly radially outside of said edges, an annular body of rubber cushion material firmer than the soft cushion material above, a hub within the latter body having an annular groove about the hub, within which housing and hub, parts of the body lie so that the body will be compressed against the edges of the housing with axial movement of the hub, the ring of soft rubber and the annular body of rubber cushion material in unstressed position incompletely occupying the space within the housing and within the groove, and the relations of the two cushioning materials being such that approximately the same operative instrument deflection is secured vertically as horizontally, a tubular skirt connected with the body and extending generally parallel with the hub and a flange extending annularly from the skirt, over the housing and rigidly connected with the said skirt.

11. A hub for a vibration dampening mount having a plurality of circular grooves, said grooves terminating in abrupt supporting edges.

12. A hub for a vibration dampening mount having a plurality of circular grooves, said grooves terminating in abrupt supporting edges, resilient rings of rubber or like material partly within the grooves and annular housing edges engaged by the outer parts of the rings.

13. A primary dampening element for a shock absorbing mount comprising a resilient annular central body portion flattened at its outer periphery and curved on the innermost contour of its axial cross section, and a pair of skirts oppositely extending from said body portion.

14. A vibration absorbing mount for aircraft and the like providing substantially equal shock absorbing characteristics in all planes, comprising a housing having a pair of annular lips, a sponge rubber bushing in said housing, said bushing having bevelled edges to provide a recess between said lips and said bushing, a second bushing having bevelled edges abutting on said lips to provide additional recesses between said lips and said first and second bushings, a convex surface on the inside diameter of the second bushing, a hub having a radial groove therein for partially contacting the convex surface of the bushing, said groove being of greater area than the convex surface whereby additional recesses are provided between the hub and the second bushing.

15. Apparatus according to claim 14 in which the second bushing has a pair of oppositely extending skirts for engaging the outer surface of the hub upon angular displacement of the hub.

16. A primary dampening element for a shock absorbing mount comprising a resilient annular central body portion having a curved outer and a curved inner contour, a pair of skirts oppositely extending from said body portion and flanges outwardly extending from the skirts, adapted to snub the vibration if the amplitude becomes too great.

BENJAMIN B. WHITTAM.

REFERENCES CITED

The following references are of record in the file of this patent:

UNITED STATES PATENTS

| Number | Name | Date |
|---|---|---|
| 28,619 | Vose | June 5, 1860 |
| 475,311 | Hart | May 24, 1892 |
| 1,820,220 | Geyer | Aug. 25, 1931 |
| 2,115,713 | Haire | May 3, 1938 |
| 2,221,884 | Schmidt | Nov. 19, 1940 |
| 2,340,629 | Trier | Feb. 1, 1944 |
| 2,359,942 | Rosenzweig | Oct. 10, 1944 |
| 2,375,105 | Hile | May 1, 1945 |
| 2,386,463 | Hile | Oct. 9, 1945 |
| 2,415,280 | Fink | Feb. 4, 1947 |
| 2,422,683 | Kaemmerling | June 24, 1947 |

FOREIGN PATENTS

| Number | Country | Date |
|---|---|---|
| 105,133 | Australia | Sept. 12, 1938 |
| 524,203 | Great Britain | Aug. 1, 1940 |
| 548,149 | Great Britain | Feb. 12, 1942 |